United States Patent
Fukano et al.

[11] Patent Number: 6,029,903
[45] Date of Patent: Feb. 29, 2000

[54] SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/035,994

[22] Filed: Mar. 6, 1998

[30] Foreign Application Priority Data

Mar. 14, 1997 [JP] Japan ................................. 9-061402

[51] Int. Cl.[7] ................................................. B05B 15/00
[52] U.S. Cl. ...................... 239/119; 239/106; 222/571; 251/30.02; 251/63.5; 251/129.15; 251/331
[58] Field of Search ........................ 239/104, 106, 239/119, 583, 586; 222/571; 251/30.02, 63.5, 129.15, 331

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,386,849 | 2/1995 | Gilchrist et al. | 251/331 X |
| 5,423,482 | 6/1995 | Mueller et al. | 239/119 X |

FOREIGN PATENT DOCUMENTS

8-10399  3/1996  Japan .

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve is equipped with a coupling having a fluid passage with a first port formed in one end, and a second port formed in another end thereof, a suck back mechanism for sucking a pressurized fluid inside the fluid passage under a displacement action of a second diaphragm which is displaced by a pilot pressure, and an ON/OFF valve disposed coaxially with the second diaphragm for opening and closing the fluid passage by displacement and movement thereof with the second diaphragm.

15 Claims, 5 Drawing Sheets

*PRIOR ART*

SUCK BACK VALVE

BACKGROUND OF THE INVENTION

1. Field of the Invention

The present invention relates to a suck back valve in which liquid dripping, for example occurring at a supply port of a fluid passage, is prevented by sucking a predetermined amount of fluid flowing through the fluid passage by displacement of a diaphragm, yet wherein the sucked amount of fluid can be stabilized.

2. Description of the Related Art

There has hitherto been known, for example, a semiconductor wafer manufacturing process in which a suck back valve is employed. In the suck back valve, when supply of coating liquid to the semiconductor wafer is halted, there is a function for preventing so called liquid drip, wherein minute amounts of coating liquid drip from a supply port onto the semiconductor wafer.

Figure 5:
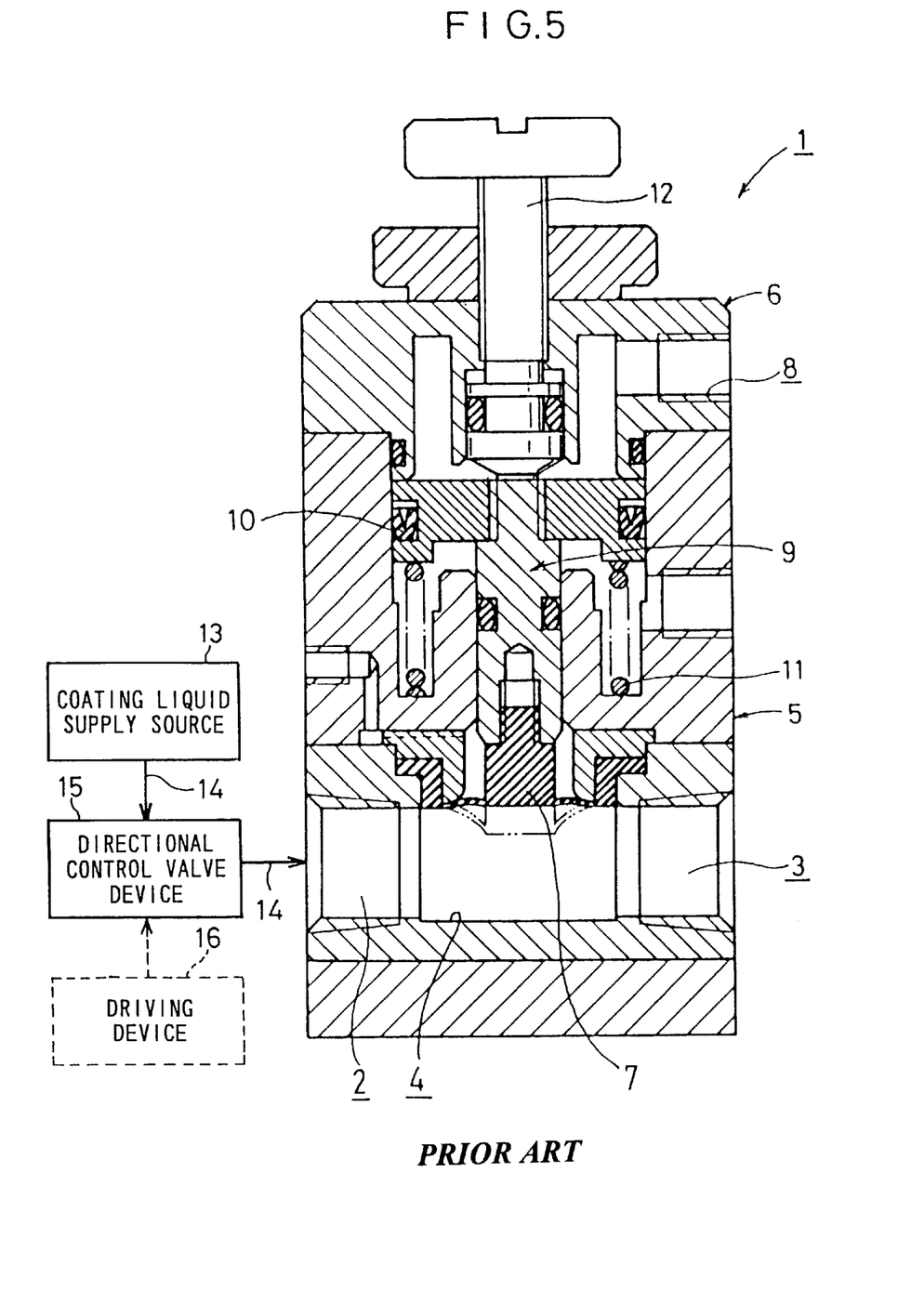
FIG. 5 is a vertical cross-sectional view of a suck back valve according to a conventional technique.

The suck back valve according to such a conventional technique is shown in FIG. 5 and is disclosed, for example, by Japanese Utility Model Publication No. 8-10399.

Such a suck back valve 1 comprises a main valve body 5 formed with a fluid passage 4 interconnecting a fluid inlet port 2 and a fluid outlet port 3, and includes a bonnet 6 connected to an upper portion of the main valve body 5. A diaphragm 7 made up of a thick-walled portion and a thin-walled portion is disposed in the center of the fluid passage 4. An unillustrated pressurized fluid supply source is connected to the bonnet 6, the bonnet further being formed with a pressurized fluid supply port 8 for supplying pressurized air for operating a diaphragm under a switchover action of a directional control valve (not shown).

A piston 9 is fitted to the diaphragm 7, with a v-packing 10 installed in the piston 9 and slidable along an inner wall surface of the main valve body 5 and serving a sealing function. Further, a spring 11 which normally presses the piston 9 in a upward direction, is disposed in the main valve body 5.

An adjusting screw 12 is disposed on the top of the bonnet 6 which, by increasing or decreasing a screw-in amount thereof, abuts against the piston 9 and adjusts a displacement amount of the piston 9, whereby the amount of coating liquid sucked by the diaphragm 7 is adjusted.

A coating liquid supply source 13 storing therein a coating liquid is connected to the second fluid inlet port 2 through a tube 14, and further, a directional control valve device 15 made up for example by an ON/OFF valve which is constructed separately from the suck back valve 1 is connected between the coating liquid supply source 13 and the fluid inlet port 2. By energization and deenergization thereof, the directional control valve device 15 serves a function of switching between a coating liquid supply condition and a supply-halted condition with respect to the suck back valve 1.

Operation of the suck back valve 1 shall now be explained in outline. In an ordinary state in which the fluid is supplied from the fluid inlet port 2 to the fluid outlet port 3, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 5 by the two-dot-chain line.

At that point, under a switch-over operation of the directional control valve device 15, the flow of coating liquid in the fluid passage 4 is halted, and in that case, by halting the supply of pressurized air from the pressurized air supply port 8, the piston 9 and diaphragm 7 are raised in unison by an elastic force of the spring 11, whereby any coating liquid which remains inside the fluid passage 4 is sucked under a negative pressure action of the diaphragm 7, preventing unwanted liquid dripping from occurring at an unillustrated supply port.

Incidentally, in the suck back valve 1 according to this conventional technique, a separately constructed directional control valve device 15 is disposed between the coating liquid supply source 13 and the suck back valve 1, wherein by means of an ON/OFF operation of the directional control valve device 15 through a driving device 16, the coating liquid inside the fluid passage 4 of the suck back valve 1 is supplied, or alternatively, supply thereof is halted.

Notwithstanding, in the suck back valve 1 according to this conventional technique, pipe connecting operations between the suck back valve 1 and the directional control valve device 15 become necessary, adding complexity to the system, and in addition, the directional control valve device 15 and the driving device 16 for causing an ON/OFF operation thereof, must be provided externally of the suck back valve 1. As a result, a dedicated space for connection of the directional control valve device 15 and the driving device 16 becomes necessary, increasing the overall installation space, and resulting in the disadvantage of soaring equipment costs.

Further, fluid passage resistance is increased due to pipes which are connected between the suck back valve 1 and the directional control valve device 15, with the disadvantage that response accuracy (responsiveness) of the diaphragm 7 is deteriorated.

SUMMARY OF THE INVENTION

A general object of the present invention is to provide a suck back valve in which, by making unnecessary a directional control valve device and a driving device for effecting an ON/OFF operation thereof, it becomes possible that the dedicated space for the suck back valve is reduced, and installation space therefor is effectively utilized.

A main object of the present invention is to provide a suck back valve in which, by making unnecessary pipe connecting operations for interconnecting a directional control valve device and a driving device to the suck back valve, the suck back valve can be easily arranged and installed.

Another object of the present invention is to provide a suck back valve in which, by reducing passage resistance of a fluid flowing through a fluid passage, the response accuracy of a diaphragm can be improved.

The above and other objects, features and advantages of the present invention will become more apparent from the following description when taking in conjunction with the accompanying drawings in which preferred embodiments of the present invention are shown by way of illustrative example.

DETAILED DESCRIPTION OF THE PREFERRED EMBODIMENTS

Figure 1:
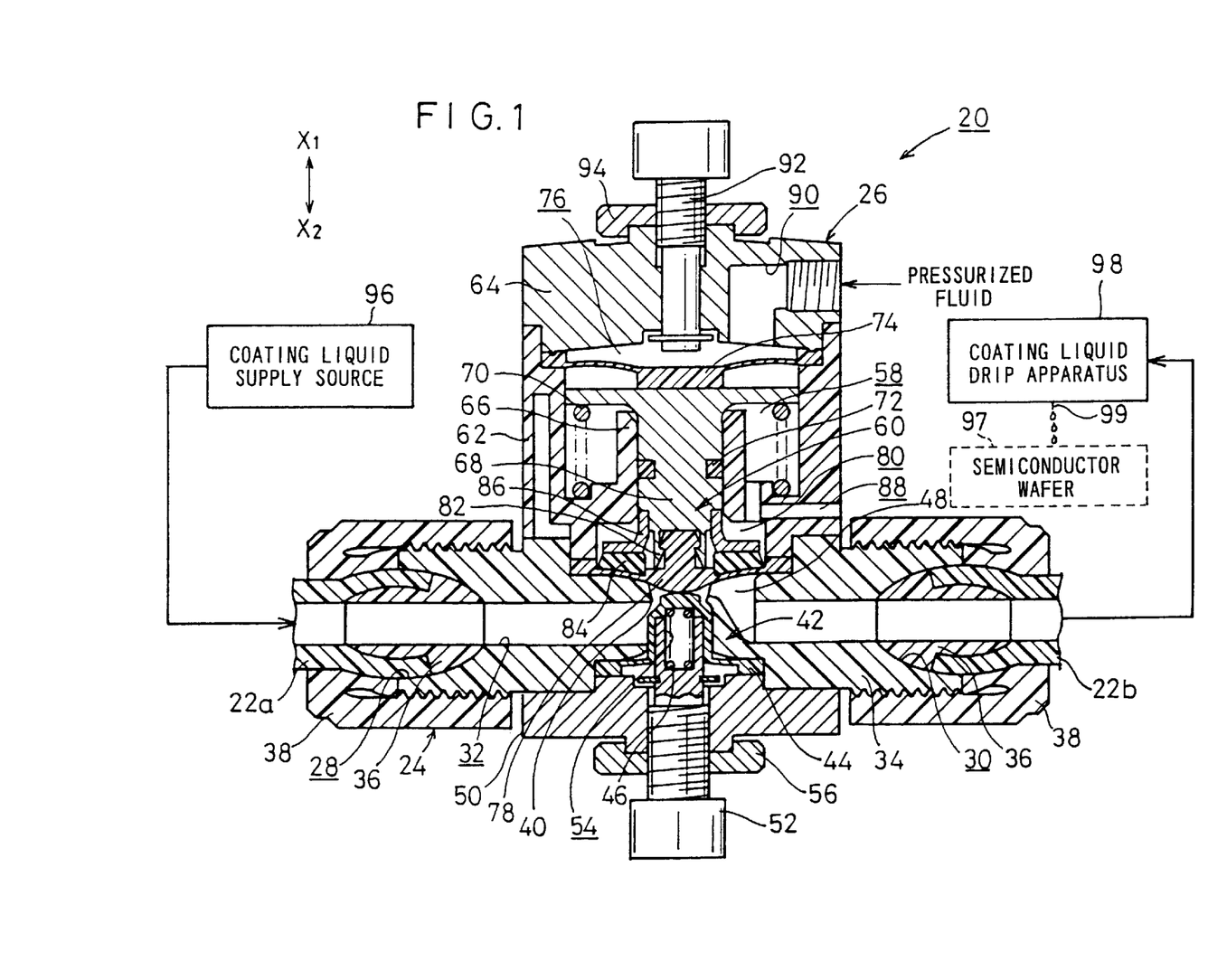
FIG. 1 is a perspective view of the suck back valve according to an embodiment of the present invention.

In FIG. 1, reference number 20 designates a suck back valve in accordance with an embodiment of the present invention. The suck back valve 20 is constructed by a coupling 24 having a pair of detachable tubes 22a, 22b connected thereto at a fixed interval separation, and a main body 26 integrally disposed on top of the coupling 24.

The coupling 24 includes a coupling body 34 having a first port 28 formed in one end, and a second port 30 formed in another end thereof, together with a fluid passage 32 interconnecting the first port 28 and the second port 30, inner elements 36 respectively connected to the first port 28 and the second port 30, and inserted into openings of the tubes 22a, 22b, and lock nuts 38 which maintain fluid-tightness of the connections of the tubes 22a, 22b by means of threading onto threads which are cut into ends of the coupling body 34.

An ON/OFF valve 42 for opening and closing the fluid passage 32 by seating and unseating of a seat 40 is disposed centrally in the coupling body 34. The ON/OFF valve 42 includes an elastomeric member 44 extending from a cavity on a lower part of the coupling body 34, which faces upwardly, and by the elastic form thereof is seated onto the seat 40, and further has a spring element 46 which normally biases the central portion of the elastomeric member 44 upwardly by an elastic force of the spring element 46. Reference numeral 48 indicates a cut-away formed in proximity to the seat 40. Further, the central part of the elastomeric member 44 is formed to be somewhat thicker comparatively than the other parts thereof.

A support plate 50 is disposed in a central part of the coupling body 34 for supporting the elastomeric member 44, with a screw member 52 disposed in a screw hole of the support plate 50, for adjusting a separation interval between the elastomeric member 44 and the seat 40. Further, on one end of the screw member 52, a hole 54 is formed for supporting the spring element 46. Furthermore, a lock nut 56 is disposed for maintaining a fixed position of the screw member 52.

The main body 26 includes a valve body 62 connected to an upper part of the coupling body 34, and having arranged therein a suck back mechanism 60 in a chamber 58 formed in the interior thereof, as well as a cover member 64 formed on an upper part of the valve body 62 and blocking an opening of the valve body 62.

The suck back mechanism 60 comprises a stem 68 displaceable in directions of arrows $X_1$ and $X_2$ while being guided by a guide 66 formed integrally with the valve body 62, and a spring element 70 which engages a flange of the stem 68 and ordinarily biases the stem 68 in an upward direction (arrow $X_1$) by an elastic force thereof.

A first diaphragm 74 which engages an upper surface of the stem 68 extends from an upper part of the stem 68, whereby by supplying a pilot pressure in an upward direction of the first diaphragm 74, a first diaphragm chamber (pilot chamber) 76 for operating on the first diaphragm 74 is formed.

On the other hand, a second diaphragm chamber 80 which is blocked by the second diaphragm (flexible member) 78 is formed on a lower part of the stem 68. Further, by engagement of a thick-walled portion of the second diaphragm 78 with a plurality of prongs 82 formed on a lower end of the stem 68, the second diaphragm 78 is disposed for displacement integrally with the stem 68.

A bottom surface of a central port of the second diaphragm 78 is disposed for abutment with an upper surface of a central port of the aforementioned elastomeric member 44, wherein the second diaphragm 78 and the elastomeric member 44 are disposed so as to be operated in tandem by displacement of the stem 68.

More specifically, by supplying a pilot pressure to the first diaphragm chamber 76 and displacing the stem 68 in a downward direction (arrow $X_2$), the thick-walled portion of the second diaphragm presses downwardly (in the direction of arrow $X_2$) on the central part of the elastomeric member 44 of the ON/OFF valve 42, in opposition to an elastic force of the spring member 46. Accordingly, the central part of the elastomeric member 44 making up the ON/OFF valve 42 separates from the seat 40, establishing communication between the first port 28 and the second port 30, whereby a pressurized fluid flows along the fluid passage 32.

Further, a ring-shaped cushioning member 84, formed for example from a rubber material or the like, is disposed on an upper surface of the second diaphragm 78 for supporting a thin-walled portion of the second diaphragm 78, wherein the cushioning member 84 is maintained by a cross-sectionally L-shaped support member 86 connected to a lower end of the stem 68.

In this case, the second diaphragm 78 making up the suck back mechanism 60 is disposed coaxially with the elastomeric member 44 making up the ON/OFF valve 42. Herein, the term "coaxially" shall be defined to include any of situations in which the axes of the second diaphragm 78 and the elastomeric member 44 are the same, the axes of the second diaphragm 78 and the elastomeric member 44 are formed to be roughly parallel, and in which the axes of the second diaphragm 78 and the elastomeric member 44 are provided to be substantially the same but including some deviation with each other to a certain tolerance.

Further, a passage 88 communicating the second diaphragm chamber 80 to atmosphere is formed in the valve body 62, wherein by supply and discharge of air inside the second diaphragm chamber 80 through the passage 88, the second diaphragm 78 can be smoothly operated.

A pilot passage 90 is formed in the cover member 64, communicating with the first diaphragm chamber 76, for supplying a pilot pressure to the first diaphragm chamber 76. Further, a screw hole is formed in a central part of the cover member 64, with a stopper 92 threadedly inserted into the screw hole, for regulating a displacement amount of the first diaphragm 74. The stopper 92 is kept in a fixed position by a lock nut 94.

The suck back valve 20 in accordance with this embodiment of the invention is constructed basically as described above. Next, an explanation shall be given of the operation and effects thereof.

First, a coating liquid supply source 96 storing therein a coating liquid is connected to the tube 22a communicating with the first port 28 of the suck back valve 20, whereby a coating liquid drip apparatus 98 having a nozzle 99 for dripping a coating liquid toward a semiconductor wafer 97 is connected to the tube 22b communicating with the second port 30. Further, an unillustrated pressurized fluid supply source is connected to the pilot passage 90.

After completing these preparatory measures, the unillustrated pressurized fluid supply source is activated, and a pressurized fluid (pilot pressure) is introduced to the pilot passage 90. The pressurized fluid introduced from the pilot passage 90 is supplied to the first diaphragm chamber 76, and under action of the pilot pressure, the first diaphragm 74 flexes and the stem 68 is pressed downward in the direction of arrow $X_2$.

Accordingly, the second diaphragm 78 which is connected to a lower end of the stem 68 presses downwardly on the central part of the elastomeric member 44 of the ON/OFF valve 42, in opposition to an elastic force of the spring element 46. Thus, the central part of the second diaphragm 78 and the central part of the elastomeric member 44 of the ON/OFF valve 42 are operated together in unison downwardly in the direction of arrow $X_2$, while maintaining a state of abutment therebetween, resulting in the state shown in FIG. 1. As a result, by displacement of the elastomeric member 44 which makes up the ON/OFF valve 42, the elastomeric member 44 separates from the seat 40, assuming an ON state, and establishing communication between the first port 28 and the second port 30.

In this manner, by the ON/OFF valve 42 assuming an ON state under action of a pilot pressure supplied to the first diaphragm chamber 76, the coating liquid supplied from the coating liquid supply source 96 flows along the fluid passage 32, and the coating liquid is dripped onto the semiconductor wafer 97 through the nozzle 99 of the coating liquid drip apparatus 98. Thus, a coating layer (not shown) having a desired thickness is formed on the semiconductor wafer 97.

After a predetermined amount of coating liquid has been applied to the semiconductor wafer 97 through the coating liquid drip apparatus 98, supply of pilot pressure to the first diaphragm chamber 76 is halted under a switching operation of an unillustrated directional control valve, and the pilot pressure is released to atmosphere.

In this case, by putting the diaphragm chamber 76 in an atmospheric state, the first diaphragm 74, the stem 68, and the second diaphragm 78 are displaced upwardly (arrow $X_1$) in unison under action of the elastic force of the spring element 70, and simultaneously, the central part of the elastomeric member 44 making up the ON/OFF valve 42 is elastically deformed upwardly under action of the elastic force of the spring element 46.

More specifically, the central part of the elastomeric member 44 making up the ON/OFF valve 42 is elastically deformed under action of the elastic force of the spring element 46, and while maintaining a state of abutment with the bottom surface of the central part of the second diaphragm 78, is seated onto the seat 40. Thus, communication between the first port 28 and the second port 30 is interrupted. As a result, supply of coating liquid to the semiconductor wafer 97 is halted, and the dripping state of coating liquid from the nozzle 99 of the coating liquid drip apparatus 98 with respect to the semiconductor wafer 97 is likewise halted. When this happens, because coating liquid immediately preceding that which has dripped onto the semiconductor wafer 97 remains inside the nozzle 99 of the coating liquid drip apparatus 98, there is a fear that unwanted liquid dripping may occur.

Figure 2:
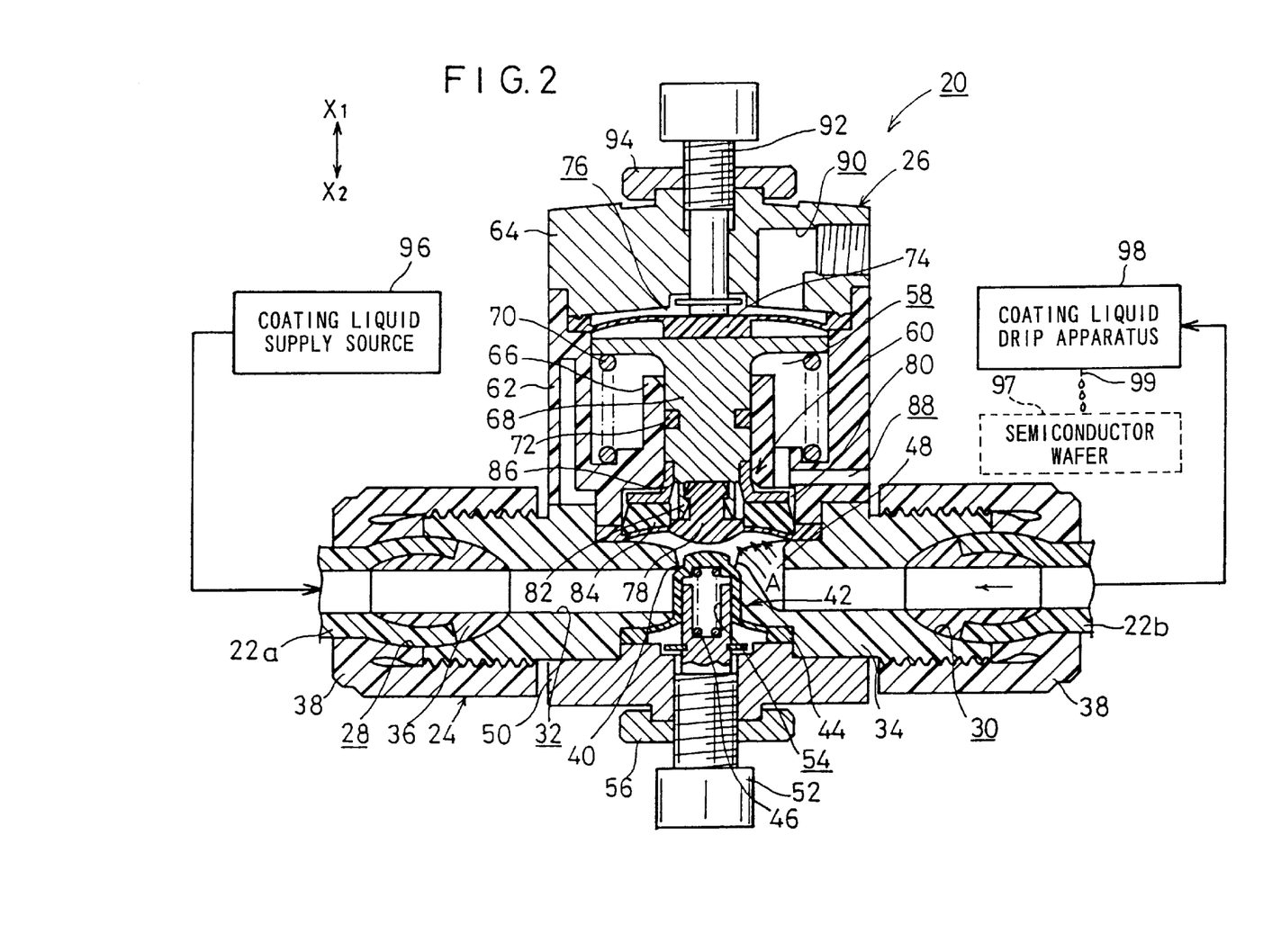
FIG. 2 is a vertical cross-sectional view showing displacement of a diaphragm, and sucking of a coating liquid inside a passage, of the suck back valve of FIG. 1.

At that point, after seating of the elastomeric member 44 making up the ON/OFF valve 42 onto the seat 40, the first diaphragm 74, the stem 68 and the second diaphragm 78 are integrally displaced upwardly in the direction of arrow $X_1$ under action of the elastic force of the spring element 70, thus reaching the state shown in FIG. 2, and by a negative pressure action generated by the second diaphragm 78, any coating liquid remaining inside the nozzle 99 is sucked back.

More specifically, the first diaphragm 74 is raised until it abuts with an end of the stopper 92, and further, by displacement of the second diaphragm 78 in the direction of arrow $X_1$ through the stem 68, the second diaphragm 78 separates a fixed distance coaxially from the elastomeric member 44 making up the ON/OFF valve 42. Further, as shown in FIG. 2, the second diaphragm 78 displaces upwardly, thereby generating a negative pressure effect, so that a fixed amount of coating liquid inside the fluid passage 32 is sucked along the direction of arrow A through the cutaway 48. As a result, a fixed amount of coating liquid remaining inside the nozzle 99 of the coating liquid drip apparatus 98 is returned toward the side of the suck back valve 20, thus enabling prevention of unwanted liquid dripping with respect to the semiconductor wafer 97.

Further, the first diaphragm 74, the stem 68, and the second diaphragm 78 are displaced downward (in the direction of arrow $X_2$) by once again introducing pilot pressure to the first diaphragm chamber 76 from the pressurized fluid supply source, by switching an unillustrated directional control valve, and by separation of the elastomeric member 44 making up the ON/OFF valve 42 away from the seat 40, in opposition to the elastic force of the spring element 46, the state shown by FIG. 1 is restored, whereby dripping of coating liquid onto the semiconductor wafer 97 is reinitiated.

In the present embodiment, the suck back valve mechanism 60 which includes the stem 68 and the second diaphragm 78, and an ON/OFF valve 42 including the elastomeric member 44, are disposed coaxially. Further, the second diaphragm 78 which effects a negative pressure action, and the elastomeric member 44 which opens/closes the fluid passage 32 are constructed for operation in tandem.

As a result, in the present embodiment, pipe connections between the suck back valve 20 and the ON/OFF valve 42 are not needed, and moreover, differing from the conventional technique, because a dedicated space is not required for installation of a separately constructed directional control valve device 15 and a driving device 16 therefor, installation space can be efficiently utilized.

Further, in the present embodiment, the ON/OFF valve 42 is arranged so as to be operated in tandem with the suck back mechanism 60, and further, by constructing the same so as to be integrally assembled with the suck back mechanism 60, in contradistinction to the conventional technique, a separate driving device for driving the ON/OFF valve 42 becomes unnecessary, wherein the overall apparatus can be made small in scale. Accordingly, a reduction in production costs can be achieved.

Furthermore, because piping is not required between the suck back valve 20 and the ON/OFF valve 42, an increase in fluid passage resistance is avoided, so that response accuracy of the first diaphragm 74 operated by pilot pressure can be increased, and coating liquid remaining inside the fluid passage 32 can be swiftly sucked back by the second diaphragm 78.

Figure 3:
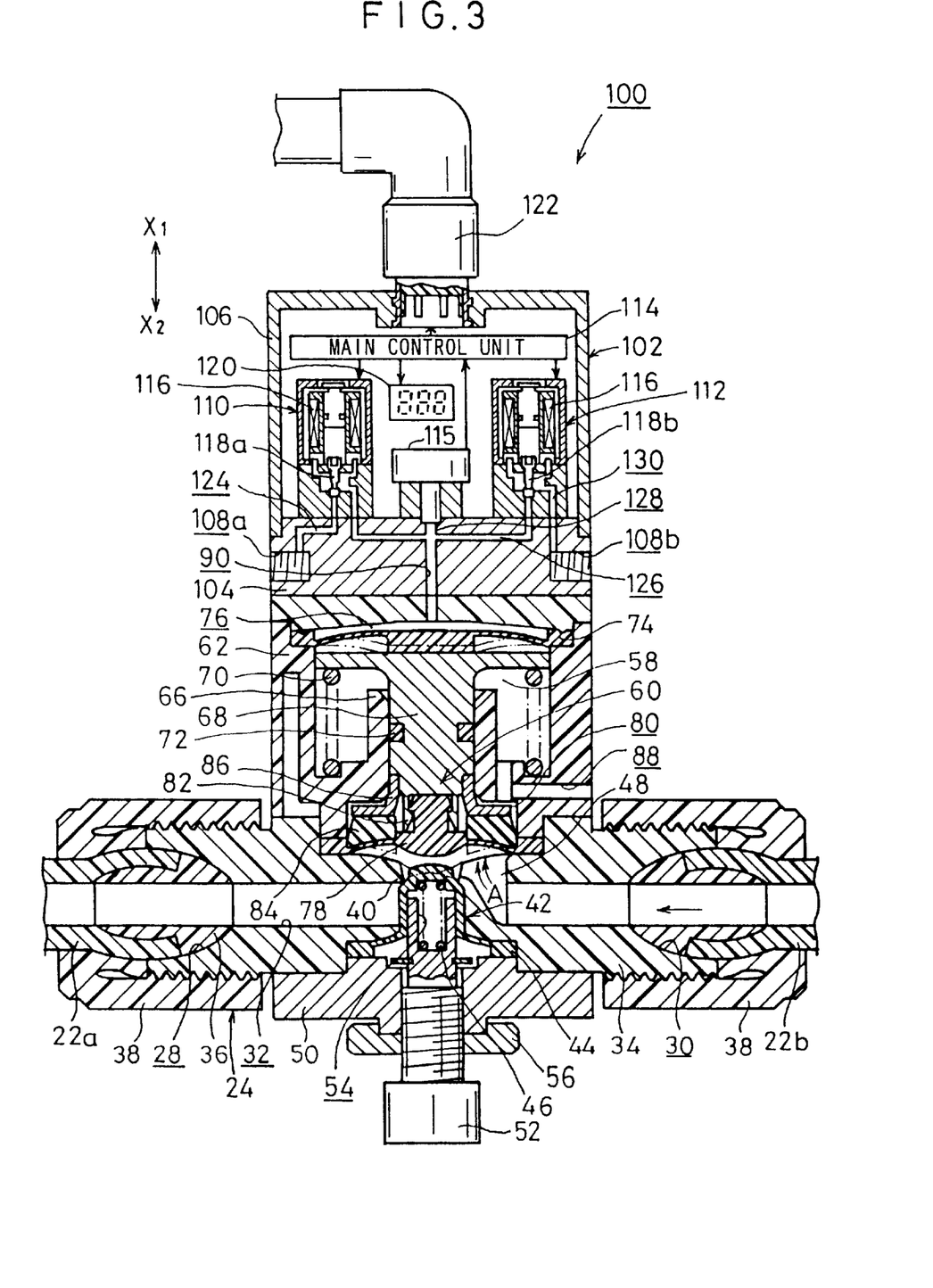
FIG. 3 is a vertical cross-sectional view of a suck back valve according to another embodiment of the present invention.

Next, in FIG. 3, a suck back valve 100 in accordance with another embodiment of the present invention is shown. Structural elements which are the same as those of the suck back valve 20 shown in FIG. 1 are designated with like reference numerals, and in the following, only those elements which are different therefrom shall be described.

The suck back valve 100 differs from the suck back valve 20 of FIG. 1 in that a controller 102 is provided for controlling a pressurized fluid (pilot pressure) which is supplied to the suck back mechanism 60.

The controller 102 has a housing 106 integrally assembled with the main body 26 through a plate 104, wherein a pressurized fluid supply port 108a and a pressurized fluid discharge port 108b are formed in the plate 104.

Inside of the housing are arranged a first electromagnetic valve 110 functioning as a supply valve for controlling the pilot pressure supplied to the first diaphragm chamber 76 through the pilot passage 90, a second electromagnetic valve 112 functioning as a discharge valve by discharging to the outside the pressurized fluid supplied by the first electromagnetic valve 110, and a pressure sensor 115 which detects a pilot pressure supplied by the first electromagnetic valve 110 and which issues a corresponding pressure signal to the main control unit 114.

The first electromagnetic valve 110 and the second electromagnetic valve 112 are respectively normally closed type valves, wherein by respectively outputting current signals to electromagnetic coils 116 of the first and second electromagnetic valve 110, 112 from a main control unit 114, valve bodies 118a, 118b therein are drawn in the direction of arrow $X_1$, resulting in a valve-open state.

Along with displaying the pressure values detected by the pressure sensor 115 on an LED device 120, as necessary, set pressure values which are set via an unillustrated key input device through a connector 122 are also displayed on the LED device 120.

An unillustrated MPU (multiprocessor unit), with functions serving as various means for control, evaluation, processing, calculation and memory, is disposed in the main control unit 114, wherein by energizing and deenergizing the first electromagnetic valve 110 and the second electromagnetic valve 112 by output of control signals from the MPU, the pilot pressure supplied to the first diaphragm chamber 76 is controlled.

Further, in the plate 104, there are disposed a first passage 124 for establishing communication between the pressurized fluid supply port 108a and the first electromagnetic valve 110, a second passage 126 for establishing communication between the first electromagnetic valve 110 and the second electromagnetic valve 112, a third passage 128 branching from the second passage 126 and introducing a pilot pressure to the pressure sensor 115, a pilot passage 90 branching from the second passage 126 and supplying a pilot pressure to the first diaphragm chamber 76, and a fourth passage 130 establishing communication between the second electromagnetic valve 112 and the pressurized fluid discharge port 108b.

In this case, when a current signal is supplied from the main control unit 114 to the electromagnetic coil 116 of the first electromagnetic valve 110, the valve body 118a displaces, resulting in a valve-open state, and establishing communication between the first passage 124 and the second passage 126. Accordingly, pressurized fluid (pilot pressure) supplied from the pressurized fluid supply port 108a is supplied to the first diaphragm chamber 76 through the first passage 124, the second passage 126 and the pilot passage 90.

On the other hand, when a current signal is supplied from the main control unit 114 to the electromagnetic coil 116 of the second electromagnetic valve 112, the valve body 118b displaces resulting in a valve-open state, and establishing communication between the second passage 126 and the fourth passage 130. Accordingly, pressurized fluid (pilot pressure) inside the first diaphragm chamber 76 is discharged to atmosphere through the fourth passage 130 and the pressurized fluid discharge port 108b.

Next, operation and effects of the suck back valve 100 according to this embodiment shall be described. Operations and effects which are the same as those of the suck back valve 20 shall be omitted, and only points which are different therefrom shall be emphasized.

An unillustrated pressurized fluid supply source is activated, thereby introducing a pressurized fluid to the pressurized fluid supply port 108a, and further an input signal is introduced to the main control unit 114 via an unillustrated input means. Based on the input signal, the main control unit 114 issues an electrical signal to the first electromagnetic valve 110, putting it in a valve-open state. At this time, the second electromagnetic valve 112 is deactivated and in a valve-closed state.

Accordingly, the pressurized fluid (pilot pressure) which is introduced from the pressurized fluid supply port 108a is supplied to the first diaphragm chamber 76 via the first passage 124, the second passage 126 and the pilot passage 90. The first diaphragm 74 is displaced under action of the pilot pressure supplied to the first diaphragm chamber 76, pressing the stem 68 in the direction of arrow $X_2$. As a result, the second diaphragm 78 which is connected to the lower end of the stem 68, and the elastomeric member 44 making up the ON/OFF valve 42 are displaced in unison, wherein by separation of the elastomeric member 44 away from the seat 40, the first port 28 and the second port 30 become intercommunicated (refer to the two-dot-chain line in FIG. 3). In addition, coating liquid supplied from the coating liquid supply source 96 passes through the suck back valve 100, and via the coating liquid drip apparatus 98, is dripped onto the semiconductor wafer 97.

Further, the pilot pressure supplied to the first diaphragm chamber 76 is introduced to the pressure sensor 115 through the third passage 128, and a detection signal output from the pressure sensor 115 is introduced to the main control unit 114, whereby feedback control is performed.

In this state, the main control unit 114 issues a deenergizing signal to the first electromagnetic valve 110, putting the first electromagnetic valve 110 in a valve-closed state, and simultaneously an energizing signal is output to the second electromagnetic valve 112 and the second electromagnetic valve 112 assumes a valve-open state. Accordingly, supply of pilot pressure to the first diaphragm chamber 76 is halted, and in addition, pressurized fluid remaining in the first diaphragm chamber 76 is exhausted to atmosphere through the fourth passage 130 and the pressurized fluid discharge port 108b. At this time, the first diaphragm 74 is raised in the direction of arrow $X_1$ under action of the elastic force of the spring element 70, reaching the condition shown in FIG. 3.

More specifically, the first diaphragm 74 is raised, and by displacement of the second diaphragm 78 integrally therewith via the stem 68 in the direction of arrow $X_1$, a negative pressure effect is generated. At this time, a fixed amount of coating liquid inside the fluid passage 32 is sucked along the direction of arrow A. As a result, any coating liquid that remains inside the nozzle 99 of the coating liquid drip apparatus 98 is returned toward the side of the suck back valve 100, whereby unwanted dripping of coating liquid onto the semiconductor wafer 97 can be prevented.

Further, in the case that dripping of coating liquid is reinitiated, an energizing signal is output from the main control unit 114 to the first electromagnetic valve 110, putting it in an ON state, and in addition, a deenergizing signal is output to the second electromagnetic valve 112, putting it in an OFF state, thereby restoring the initial state, and dripping of coating liquid onto the semiconductor wafer 97 is restarted.

In the present embodiment, the pilot pressure can be adjusted with good accuracy by first and second electromagnetic valves 110 and 112 which are controlled electrically by the main control unit 114. As a result, response accuracy of the first diaphragm 74 operated by pilot pressure can be improved, and coating liquid remaining in the fluid passage 32 can be swiftly sucked back.

Further, by controlling the pilot pressure through the controller 102, quality of coating liquid which is sucked by the suck back mechanism 60 is not lost, and further, the flow amount of the sucked coating liquid can be stabilized.

Figure 4:
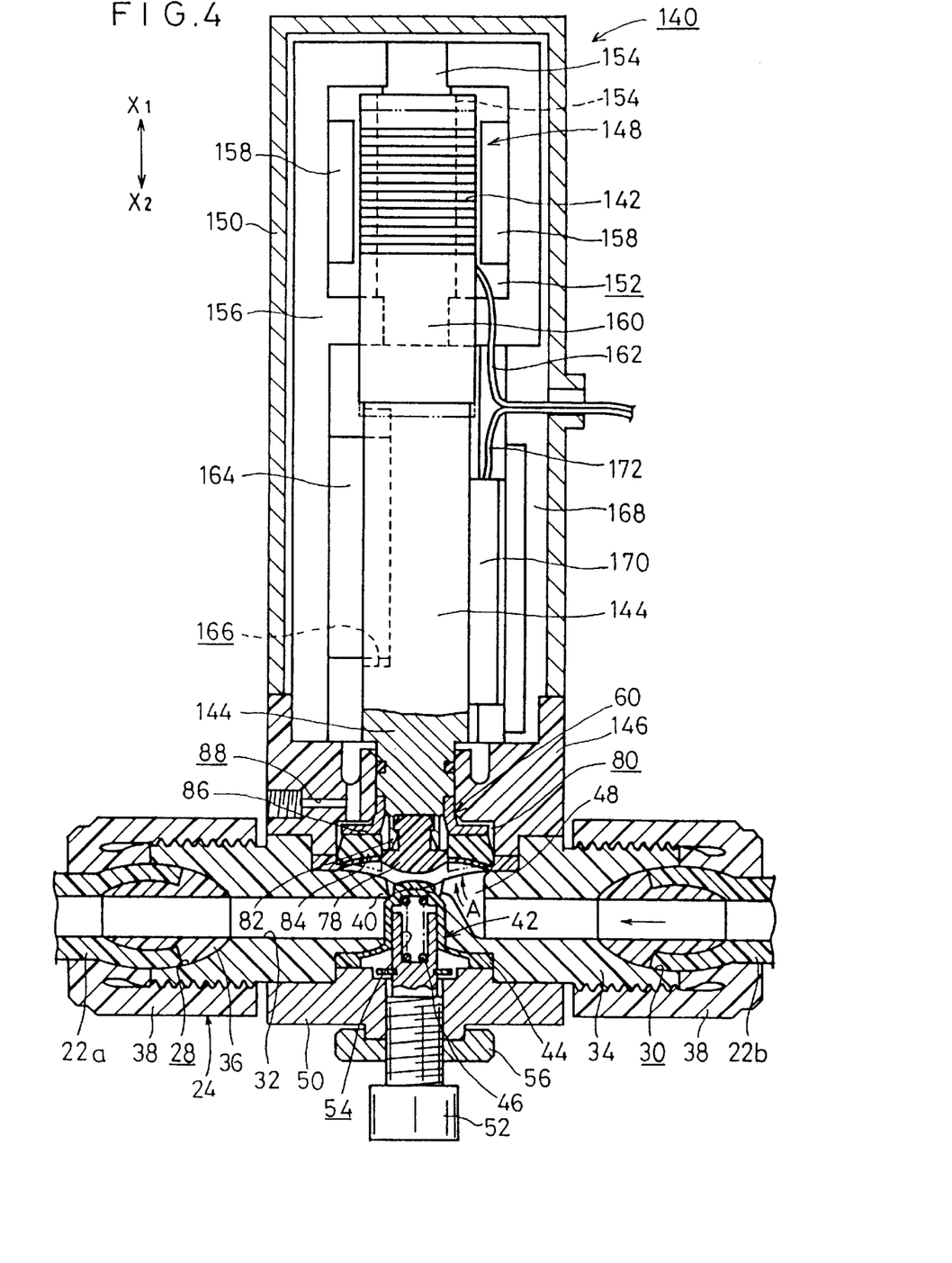
FIG. 4 is a vertical cross-sectional view of a suck back valve according to yet another embodiment of the present invention.

Next, a suck back valve 140 in accordance with still another embodiment of the present invention is shown in FIG. 4. The suck back valve 140 differs from the suck back valve 20 of FIG. 1 in that the diaphragm 78 is displaced through a stem 144 which is displaced by action of an electromagnetic force generated by an electromagnetic coil 142.

The suck back valve 140 comprises a linear voice coil type valve drive 148 which functions as an electric actuator, and which is disposed integrally through a valve body 146 connected to an upper part of the coupling 24. The valve drive 148 has a housing 150, wherein a longitudinal stem 144 is displaceably disposed along directions of arrows $X_1$ and $X_2$ inside a chamber 152 of the housing 150. A fixed iron core 154, which is affixed via a pin (not shown), is disposed in an upper central location inside the chamber 152, wherein the fixed iron core 154 is formed to extend a predetermined distance along an axial direction of the housing 150.

Further, a permanent magnet 158 is disposed inside the chamber 152, the permanent magnet 158 being attached to an inner wall surface of the housing via a support member 156, and at a predetermined distance from the fixed iron core 154. In this case, a roughly parallel magnetic field is formed between the permanent magnet 158 and the fixed iron core 154. Further, a displacement member 160, having an electromagnetic coil 142 wound thereon, is interveningly disposed between the fixed iron core 154 and the permanent magnet 158, wherein the displacement member 160 is disposed for displacement integrally with the stem 144 through a connecting pin (not shown). Further, a predetermined clearance is formed between the fixed iron core 150 and the displacement member 160. Reference numeral 162 indicates lead lines for supplying a current to the electromagnetic coil 142.

A guide member 164 is threadedly connected to an inside wall of the housing 150 through the support member 156, wherein the guide member 164 guides the stem 144 along a straight line by engagement with a recess 166 of the stem 144, and further serves a function for regulating a displacement amount of the stem 144.

An encoder 170 is affixed to an inside wall surface of the housing 150 on an opposite side from the guide member 164 through a support member 168. The encoder 170 comprises an unillustrated photosensor affixed to a side of the housing 150, and an unillustrated glass plate scale affixed to the stem 144 and formed by a glass plate having scale values formed thereon at fixed intervals. In this case, a displacement amount of the stem 144 is detected by the photosensor through the glass scale, and a detection signal output from the photosensor is fed back to an unillustrated control means through lead lines 172. Accordingly, a displacement amount of the stem 144 can be controlled with high accuracy by the control means based on the photosensor detection signal.

Next, operations and effects of the suck back valve 140 accordingly to this embodiment of the present invention shall be explained. Explanation of effects and operations thereof which are the same as in the aforementioned embodiments shall be omitted, and only those points which are different shall be emphasized.

First, an unillustrated electrical source is energized, and a current flows to the electromagnetic coil 142. In this case, under action of an electromagnetic force (described hereinafter) generated by the electromagnetic coil 142, the stem 144 and diaphragm 78 are displaced integrally in the direction of arrow $X_2$, wherein the elastomeric member 44 making up the ON/OFF valve 42 separates from the seat 40, establishing a state of connection between the first port 28 and the second port 30 (refer to the two-dot-chain line in FIG. 4).

Accordingly, coating liquid supplied from the coating liquid supply source 96 passes through the suck back valve 140, and is dripped onto the semiconductor wafer 97 through the coating liquid supply apparatus 98.

While in the above-described condition, when a current having a polarity opposite to that discussed above flows to the electromagnetic coil 142, by means of a mutual effect with the magnetic field formed by the permanent magnet 158 and the fixed iron core 154, following Flemming's left-hand rule, an electromagnetic force is generated by the electromagnetic coil 142. Under action of the electromagnetic force, the displacement member 160 with the electromagnetic coil 142 wound thereon and the stem 144 are displaced integrally in the direction of arrow $X_1$. By suitable adjustment of the size of the electric current which flows through the electromagnetic coil 142, the electromagnetic force can be adjusted to a desired size.

Further, as stated previously, by reversing the polarity of current flowing through the electromagnetic coil 142, the direction of the force can be changed from the direction of arrow $X_1$ to that of $X_2$, and vice versa.

In this manner, by displacement of the stem 144 in the direction of arrow $X_1$ under action of the electromagnetic force of the electromagnetic coil 142, the diaphragm 78 and the elastomeric member 44 making up the ON/OFF valve 42 are raised in unison, and by seating of the elastomeric member 44 onto the seat 40, supply of coating liquid is halted. In addition, under action of the electromagnetic force generated by the electromagnetic coil 142, the displacement member 160 and stem 144 are further raised, whereby the diaphragm 78 separates away from the elastomeric member 44, and as the diaphragm 78 displaces to the condition shown in FIG. 4, a fixed amount of coating liquid inside the fluid passage 32 is sucked under a sucking action of the diaphragm 78. As a result, coating liquid remaining inside the nozzle 99 of the coating liquid drip apparatus 98 is returned in the direction of the suck back valve 140, whereby unwanted liquid dripping with respect to the semiconductor wafer 97 can be prevented.

In this embodiment, because the diaphragm 78 which effects a negative pressure action is operated by electrical controls, the response time of the diaphragm 78 is shortened. Accordingly, the operation from seating of the elastomeric member 44 making up the ON/OFF valve 42 onto the seat 40 and halting of coating liquid supply, until a fixed amount of coating liquid is sucked back, can be swiftly performed.

Further, in this embodiment of the present invention, because electric controls are used, highly precise control is possible. Notwithstanding, effects of pressure variations of the pressurized fluid supply source are not received, and the flow amount of coating liquid which is sucked by the suck back valve 140 can be kept stable.

What is claimed is:

1. A suck back valve comprising:

a coupling having a fluid passage with a first port formed in one end, and a second port formed in the other end of said fluid passage;

a suck back valve mechanism for sucking a fluid inside of said fluid passage under a negative pressure action of a flexible member which is displaced by a pilot pressure; and an ON/OFF valve comprising said flexible member and an elastomeric member disposed coaxially therewith, whereby said fluid passage is opened and closed by seating of said elastomeric member onto a seat and by separation of the same from said seat, wherein said elastomeric member is disposed for abutment with said flexible member by an elastic force of a spring element, and is moved along with said flexible member by displacement of said flexible member.

2. The suck back valve according to claim 1, wherein said coupling, said suck back mechanism and said ON/OFF valve are assembled integrally.

3. The suck back valve according to claim 1, wherein said flexible member is formed by a diaphragm.

4. The suck back valve according to claim 1, wherein said suck back mechanism comprises:

a first diaphragm displaced under action of a pilot pressure supplied from a pressurized fluid supply port;

a stem displaceably disposed inside a main body and displaced in unison with said first diaphragm;

a second diaphragm connected to an end of said stem and displaceable together with said stem; and a spring element biasing said stem in a predetermined direction.

5. The suck back valve according to claim 1, wherein a central portion of said elastomeric member faces said flexible member, and by displacement thereof under an elastic force of the spring element, the central portion is seated onto a seat, and further wherein a negative pressure is effected by displacement of said flexible member in a direction away from said elastomeric member.

6. The suck back valve according to claim 1, further comprising an adjustment member for adjusting a separation interval between said elastomeric member and said seat.

7. The suck back valve according to claim 6, wherein said adjustment member comprises a support plate coupled in a central part of said coupling body, a screw member engaged in a screw hole of said support plate and having a hole on one end thereof for supporting said spring element, and a lock nut maintaining said screw member.

8. The suck back valve according to claim 1, further comprising:

a supply valve and a discharge valve for adjusting the pilot pressure supplied to said flexible member by supply and discharge of said pilot pressure; and a controller outputting respective electric signals to said supply valve and to said discharge valve, for respectively activating and deactivating said supply valve and said discharge valve.

9. The suck back valve according to claim 8, further comprising a main control unit disposed in said controller for electrically controlling said supply valve and said discharge valve.

10. The suck back valve according to claim 8, wherein said supply valve and said exhaust valve comprise respectively a first electromagnetic valve and a second electromagnetic valve.

11. A suck back valve comprising:

a coupling having a fluid passage with a first port formed in one end, and a second port formed in the other end of said fluid passage;

a suck back mechanism for sucking a fluid flowing through a fluid passage under a displacement action of a flexible member;

an ON/OFF valve disposed coaxially with said flexible member, for opening and closing a fluid passage by displacement thereof and movement together with said flexible member; and an electric linear actuator for displacing said flexible member along an axial direction thereof.

12. The suck back valve according to claim 11, wherein said electric linear actuator comprises a linear voice coil type.

13. The suck back valve according to claim 11, wherein said coupling, said suck back mechanism, said ON/OFF valve and said electric linear actuator are assembled integrally.

14. The suck back valve according to claim 11, further comprising an adjustment member for adjusting a separation interval between said elastomeric member and said seat onto which said elastomeric member is seated.

15. The suck back valve according to claim 14, wherein said adjustment member comprises a support plate coupled in a central part of said coupling body, a screw member engaged in a screw hole of said support plate and having a hole on one end thereof for supporting said spring element, and a lock nut maintaining said screw member.

* * * * *